United States Patent [19]

Muths et al.

[11] Patent Number: 6,081,706
[45] Date of Patent: Jun. 27, 2000

[54] METHOD AND SYSTEM FOR TRANSMITTING DATA TO A MOBILE COMMUNICATION UNIT

[75] Inventors: Timothy J. Muths, Keller; Steven T. Barrett, Grapevine, both of Tex.

[73] Assignee: Motorola, Inc., Schaumburg, Ill.

[21] Appl. No.: 08/953,125

[22] Filed: Oct. 17, 1997

[51] Int. Cl.[7] ................................................. H04M 11/10
[52] U.S. Cl. ........................ 455/412; 455/557; 455/560; 358/400; 358/407; 370/428; 370/342
[58] Field of Search ...................... 455/422, 455, 455/450, 434, 515, 556, 557, 558, 559, 560, 561, 412, 445; 375/222; 370/400, 428, 342; 358/402, 407, 400; 458/889

[56] References Cited

U.S. PATENT DOCUMENTS

| | | | |
|---|---|---|---|
| 5,491,565 | 2/1996 | Naper | 358/468 |
| 5,555,447 | 9/1996 | Kotzin et al. | 455/72 |
| 5,561,844 | 10/1996 | Jayapalan et al. | 455/442 |
| 5,706,329 | 1/1998 | Foldare et al. | 379/57 |
| 5,729,536 | 3/1998 | Doshi et al. | 370/328 |
| 5,790,268 | 8/1998 | Chomet | 358/407 |

OTHER PUBLICATIONS

Spragins et al., Telecommunications Protocols and Design, Addison–Wesley (c) 1991.

*Primary Examiner*—Doris H. To
*Attorney, Agent, or Firm*—Heather L. Creps; Mario J. Donato, Jr.

[57] ABSTRACT

The system includes a first data channel established between the mobile communication unit and a wireless communication system. The first data channel is configured to receive the data communication. A second data channel is established between the wireless communication system and another communication system. The second data channel is configured to receive the data communication. An interworking unit is responsive to the first data channel and the second data channel. The interworking unit receives the data communication from the second data channel and queues the data communication when the first data channel cannot receive the data communication.

16 Claims, 2 Drawing Sheets

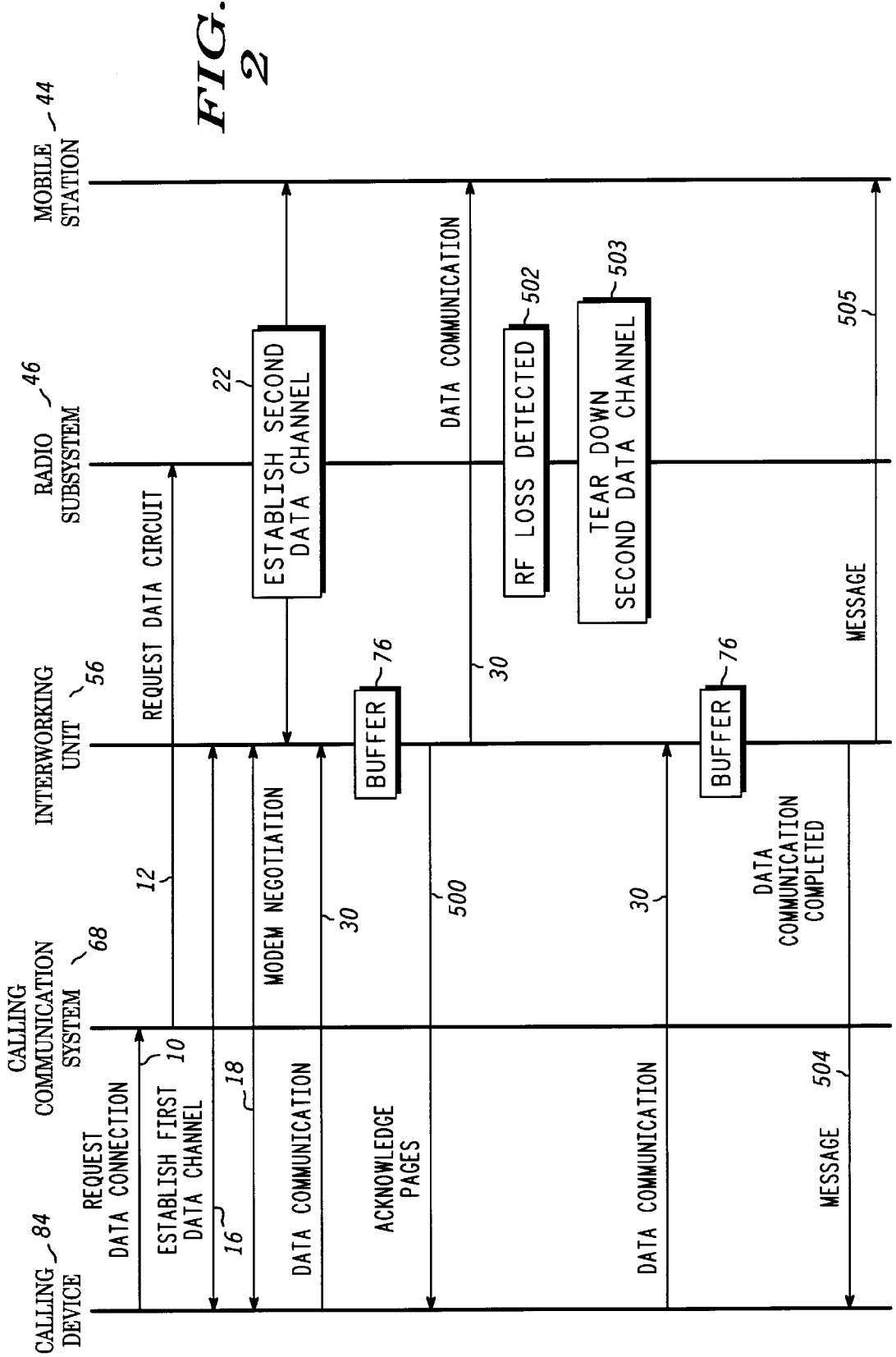

METHOD AND SYSTEM FOR TRANSMITTING DATA TO A MOBILE COMMUNICATION UNIT

This application is related to co-pending application Ser. No. 08/954,345, entitled METHOD AND SYSTEM FOR TRANSMITTING A DATA COMMUNICATION FROM A CALLING COMMUNICATION UNIT ASSOCIATED WITH A WIRELESS COMMUNICATION SYSTEM TO A CALLED COMMUNICATION UNIT, filed on Oct. 17, 1997, commonly assigned with the present application.

FIELD OF THE INVENTION

This invention relates generally to wireless communication systems, and, more particularly, to a method and system for transmitting data to a mobile communication unit.

BACKGROUND OF THE INVENTION

In a typical wireless communication system such as a cellular radio frequency (RF) radiotelephone system, a radio subsystem including a base station system having a controller and a plurality of transmitters and receivers is in communication with a switching center. An interworking unit is often in communication with one or more elements of the radio subsystem. The radio subsystem is responsive to a mobile communication unit, or station, operating within an area served by the base station system.

Multiple access wireless communication between the radio subsystem and the mobile station occurs via RF channels which provide physical paths over which digital communication signals such as voice and data are transmitted. A wireless communication system using code division multiple access (CDMA) channelization is described in detail in standards promulgated by the Electronics Industries Association (EIA) and the Telecommunications Industry Association (TIA), such as TIA/EIA Interim Standard 95 (IS-95), IS-95A and IS-96, each such standard incorporated herein by reference.

To facilitate the wireless transfer of a data communication, many mobile stations are capable of receiving or transmitting digital data from/to computers, facsimile machines and other data sources.

Computers, facsimile machines and other devices associated with other communication systems such as the public switched telephone network may also wish to transfer or receive data communications to/from mobile stations associated with wireless communication systems. one problem encountered when a device desires to transmit a data communication such as a facsimile to a mobile station is an interruption, or dropping altogether, of an RF channel between the mobile station and the radio subsystem. If the RF channel is lost, the calling device would typically have to re-dial the mobile station and re-transmit the data communication, or parts thereof. In addition, the calling device may have to contact the mobile station to determine exactly how much of the data was received prior to interruption of the RF channel.

Although store-and-forward systems exist which allow entire data communications such as facsimiles to be sent by a calling device and retrieved at a later date by a called device such as a mobile station, these systems merely act as mailboxes for data, and the delivery and/or receipt of a particular data communication may be delayed by the use of such systems.

There is therefore a need for a method and system for reliably and in real-time transmitting a data communication to a mobile communication unit, even when a channel over which the data communication is to be transferred is interrupted or is not available.

SUMMARY OF THE INVENTION

According to an aspect of the present invention, the foregoing needs are addressed by a method for transmitting a data communication from a first communication system to a mobile communication unit, the mobile communication unit responsive to a second communication system, which includes: establishing a first data channel between the mobile communication unit and the second communication system, the first data channel configured to receive and transmit the data communication; establishing a second data channel between the second communication system and the first communication system, the second data channel configured to receive and transmit the data communication; transmitting the data communication by the second data channel; buffering the data communication by the second communication system; determining whether the first data channel can receive the data communication; and when the first data channel cannot receive the data communication, continuing to transmit the data communication via the second data channel.

According to another aspect of the present invention, a method in a wireless telecommunications system for transferring data between a calling unit and a called unit, wherein the wireless telecommunications system includes base station infrastructure coupled to a public switched telephone network, includes: transmitting a request for a data connection from the calling unit to the called unit, wherein the requested data connection is a circuit mode connection; determining that the data connection is open; and in response to the determination, queueing data in the base station infrastructure for later transmission to the called unit.

According to a further aspect of the present invention, a method for transmitting a data communication from a calling communication unit to a called communication unit, the called communication unit responsive to a wireless communication system, includes: establishing a first data channel between the calling communication unit and the wireless communication system, the first data channel configured to receive and transmit the data communication; establishing a second data channel between the wireless communication system and the called communication unit, the second data channel configured to receive and transmit the data communication; transmitting the data communication by the first data channel; buffering the data communication by the wireless communication system; determining whether the second data channel can receive the data communication; and when the first data channel cannot receive the data communication, continuing to transmit the data communication via the second data channel.

According to a still further aspect of the present invention, a system for transmitting a data communication to a mobile communication unit includes a first data channel established between the mobile communication unit and a wireless communication system, the first data channel configured to receive the data communication; a second data channel established between the wireless communication system and another communication system, the second data channel configured to receive the data communication; an interworking unit responsive to the first data channel and the second data channel, the interworking unit receiving the data communication from the second data channel and queueing the data communication when the first data channel cannot receive the data communication.

Advantages of the present invention will become readily apparent to those skilled in the art from the following description of the preferred embodiment(s) of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

BRIEF DESCRIPTION OF THE DRAWINGS

FIG. 2 is a diagram illustrating a call flow for a data communication according to a preferred embodiment of the present invention.

DETAILED DESCRIPTION OF THE PREFERRED EMBODIMENTS

Figure 1:
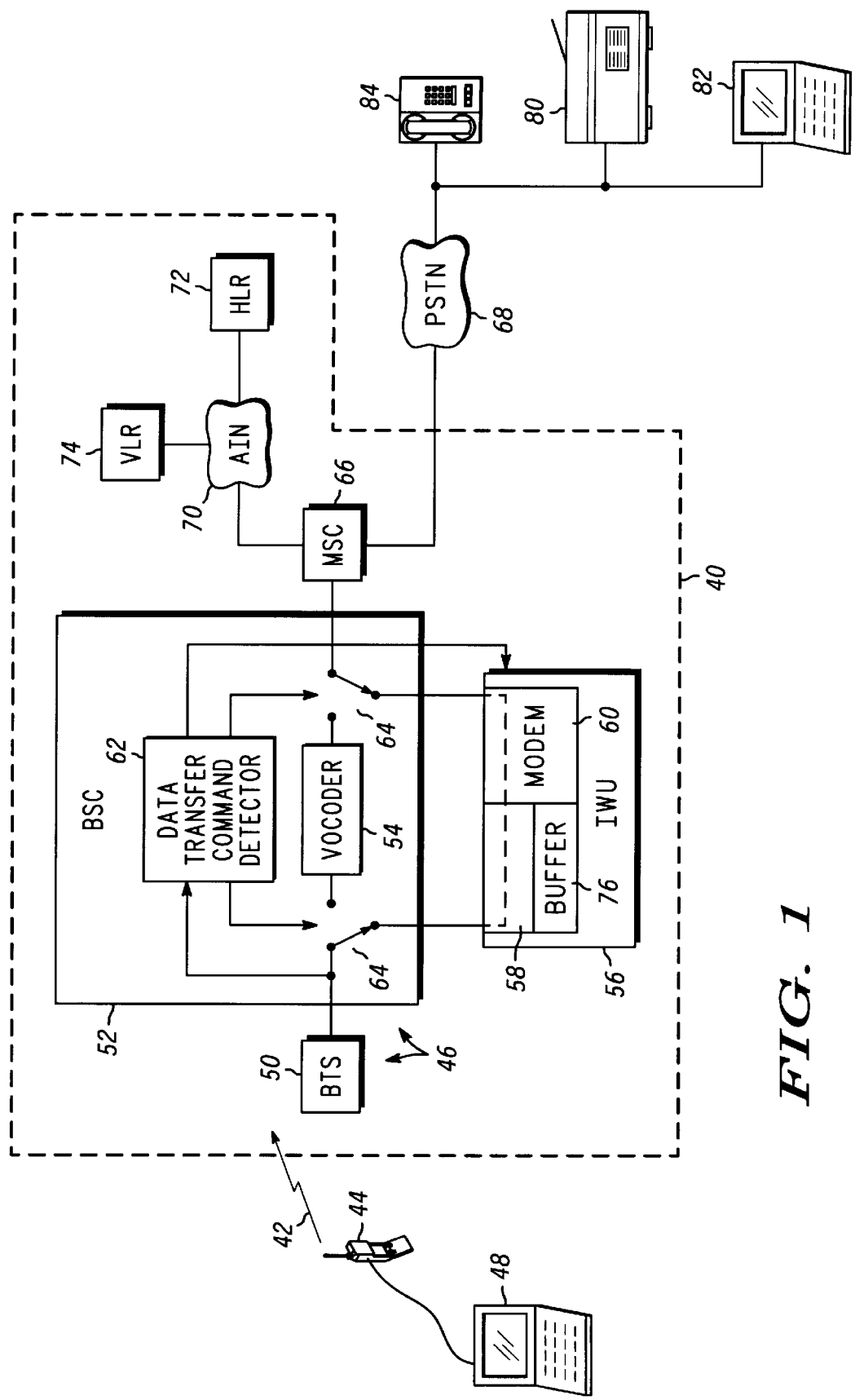
FIG. 1 is a block diagram of a wireless communication system for transmitting a data communication from a calling communication unit to a called communication unit in accordance with a preferred embodiment of the present invention.

Turning now to the drawings, wherein like numerals designate like components, FIG. 1 is a block diagram of a wireless communication system 40 for transmitting a data communication from a calling communication unit to a called communication unit in accordance with a preferred embodiment of the present invention.

A mobile communication unit 44, or mobile station, which as shown is coupled to a data source 48 such as a computer, facsimile machine, personal digital assistant or other device, is responsive to a wireless communication system 40.

Multiple access wireless communication between a base transceiver station (BTS) 50 and mobile station 44 occurs via radio frequency (RF) channels which provide physical paths over which digital communication signals such as voice, data, video and other information are transmitted. Base-to-mobile station communications are said to occur on a forward-link channel, while mobile-to-base station communications are referred to as being on a reverse-link channel. As shown, communication signal 42 has been transmitted via a forward-link channel such as a traffic channel from BTS 50 to mobile station 44.

BTS 50 is coupled to a base station controller (BSC) 52. Additional base transceiver stations (not shown) may also be coupled to BSC 52. Collectively, BTS 50 and BSC 52 may be referred to as a base station system, or a radio subsystem. BSC 52 includes, among other things, a data transfer command detector 62, which may examine communication signals to determine, according to well-known methods, whether the signals should be routed through vocoder 54 or interworking unit 56.

Vocoder 54 functions in a well-known manner to convert voice information received from mobile station 44 via base transceiver station 50 into pulse code modulation (PCM) data.

Interworking unit 56 typically includes a microprocessor or computer 58 and one or more modems 60. As shown, a buffer 76, which may be any suitable type of memory, and/or microprocessor or register, is included in interworking unit 56. Buffer, however, may be located in, or associated with, any element of wireless communication system 40. Buffer 76 functions to keep track of an amount of data received in a particular data communication, and to track an amount of data forwarded in a particular communication. Various well-known buffering methods may be employed for these purposes.

BSC 52 is in turn coupled to a mobile switching center (MSC) 66, which connects communication channels established between mobile station 44 and the base station system with selected wirelines associated with public switched telephone network (PSTN) 68 or with other network connections such as connections in advanced intelligent network (AIN) 70. Wireline connections between MSC and PSTN 68 or AIN 70 may in fact be trunks. Additional base station systems (not shown) may also be coupled to MSC 66.

A channel such as a data channel may be established via PSTN 68, between wireless communication system 40 and calling device 84, which may be a telephone, facsimile machine, computer, or other type of device capable of transmitting data.

AIN 70 may be associated with wireless communication system 40 or with another wireless communication system or with a different type of communication system altogether. As shown, AIN 70 is in communication with home location register (HLR) 72 and with visitor location register (VLR) 74, which generally serve as repositories for mobile station information, such as preferences, registration information and user profiles and other information associated with individual mobile stations. Communications with and between elements of AIN 70 may occur by way of a protocol such as Interim Standard 41, published by the Telecommunications Industry Association, Washington, D.C., or via another suitable protocol, such protocols being commonly known.

FIG. 2, with reference to FIG. 1 as appropriate, is a call flow diagram illustrating a call flow for a data communication, such as a facsimile communication, in a code division multiple access (CDMA) system according to a preferred embodiment of the present invention. First, calling device 84 sends a request for a data communication 10 to its associated calling communication system 68, such as PSTN 68. Calling communication system 68 then requests a data circuit 12 in interworking unit 56. Of course, from the perspective of interworking unit 56, request for data circuit 12 is being received from MSC 66.

Next, calling device 84 and interworking unit 56 exchange commands and data to establish a first data channel 16, such as a PSTN path. It is then possible for calling device 84 and interworking unit 56 to exchange commands and responses 18 to configure a modem associated with interworking unit 56 based on the requirements of calling device 84. One or more commands and responses 18 may be performed to properly configure the modem. Examples of commands and responses 18 include those associated with IS-99, incorporated herein by reference, and include but are not limited to baud rate instructions and carrier detect timeout instructions.

A second data channel 22, such as a mobile station path, which provides connection from interworking unit 56 to mobile station 44, is established next. Steps involved in establishing second data channel 22 are generally well-known and are similar to steps involved in establishing first data channel 16, and include but are not limited to: a request for a data communication to radio subsystem 46 via IS-687 protocol, providing for the setting up and tearing down of a data circuit between a radio subsystem and an interworking unit in a cellular communication system; an exchange of commands and data between mobile station 44 and interworking unit 56 to establish second data channel 22, such as a data communication protocol stack—a suitable stack may be established using IS-99 protocol, for example; and an exchange of commands and responses between mobile station 44 and interworking unit 56 to configure the modem associated with interworking unit 56 based on the requirements of mobile station 44.

In one embodiment of the present invention, once second data channel has been established and modem negotiation is complete, data communication 30 from calling device 84 to mobile station 44 may commence. Preferably, data communication 30 is stored by a buffer 76 at interworking unit 56. Interworking unit 56 may acknowledge 500 amounts of data communication 30, such as pages, as the amounts are received. Similarly, interworking unit 56 tracks amounts of data communication 30 which have been successfully forwarded to mobile station 44. In one example, data successfully forwarded may be deleted from buffer 76.

At this point, if an RF loss 502 occurs, second channel 22 is torn down according to well-known methods at arrow 503. First channel 16, however, is not torn down, calling device 84 continues to to transmit data communication 30, and buffer 76 continues to buffer data communication 30. Once data communication 30 has been completely received and stored by interworking unit 56, a message 504 may be directed to calling device 84 indicating a status of the transmission of data communication 30—for example, the amount of data successfully transmitted to mobile station 44. Another message 505 may be sent to mobile station 44, using well-known short-messaging services, for example, requesting mobile station 44 to retrieve the remainder of data communication 30 from wireless communication system 40. For example, mobile station 44 may be requested to dial a special number which connects directly to interworking unit 56. Then, interworking unit 56 may transmit to mobile station 44 only that amount of data not previously received by mobile station 44. Alternatively, mobile station 44 may be automatically paged by radio subsystem 46 at a later time, and the amount of information to be delivered to mobile station 44 may be negotiated.

According to another embodiment of the present invention, a data communication such as communication 30 could be stored in buffer 76 by interworking unit 56 when, after the establishment of second data channel 22, it is discovered that there is no answer at mobile station 44.

Thus, using the systems and methods described herein, reliable real-time delivery of data communications may be achieved. It is not incumbent upon the sender and/or recipient of a data communication to ensure that the communication is received in its entirety in the event an RF channel is dropped or is unavailable.

CDMA cellular communication systems have been referred to herein, but the present invention is applicable to any communication system, and the systems and methods described herein may be used independent of RF technology. Examples of other suitable types of communication systems include but are not limited to wireless local loop communication systems, analog communication systems such as the total access communication system (TACS), and digital communication systems such as groupe special mobile (GSM), a European time division multiple access (TDMA) system, pacific digital cellular (PDC), a Japanese TDMA system. Further, any communication system protocols are suitable for use with the systems and methods of the present invention, such as Electronics Industries Association 553 (EIA-553) and Interim Standard 54 (IS-54), among others.

The principles of the present invention which apply to cellular-based communication systems and/or landline-based communication systems may also apply to other types of communication systems, including but not limited to personal communication systems, trunked systems, satellite communication systems and data networks. Likewise, the principles of the present invention which apply to all types of radio frequency channels also apply to other types of communication channels, such as electronic data buses, wireline channels, optical fiber links and satellite links.

It will be apparent that other and further forms of the invention may be devised without departing from the spirit and scope of the appended claims and their equivalents. It will also be understood that this invention is not to be limited in any manner to the specific embodiments described above, but will only be governed by the following claims and their equivalents.

We claim:

1. A method for transmitting a data communication from a first communication system to a mobile communication unit, the mobile communication unit responsive to a second communication system, the method comprising:

establishing a first data channel between the mobile communication unit and the second communication system, the first data channel configured to receive and transmit the data communication;

establishing a second data channel between the second communication system and the first communication system, the second data channel configured to receive and transmit the data communication;

transmitting the data communication by the second data channel;

determining whether the first data channel can no longer receive the data communication;

when the first data channel can no longer receive the data communication, continuing to transmit the data communication via the second data channel;

storing the portion of the data communication that is continuing to be transmitted via the second data channel, wherein the step of storing includes storing the data communication by an interworking unit within the second communication system and the interworking unit further records an amount of the data communication transmitted successfully via the first data channel;

determining whether the first data channel can resume receiving the data communication; and delivering the stored data communication to the communication unit, wherein the step of delivering includes accessing the mobile communication unit via the second communication system.

2. The method according to claim 1, wherein the first communication system comprises a public switched telephone network.

3. The method according to claim 1, wherein the second communication system comprises a wireless communication system.

4. The method according to claim 3, wherein the wireless communication system comprises a code division multiple access (CDMA) communication system.

5. The method according to claim 1, wherein the data communication comprises a facsimile data transmission.

6. The method according to claim 1, wherein the second communication system comprises:

a switching center in communication with a base station system; and the interworking unit responsive to the base station system and the switching center.

7. The method according to claim 6, wherein the interworking unit comprises a modem.

8. The method according to claim 1, wherein a first portion of the first data channel comprises a radio frequency channel.

9. The method according to claim 8, wherein the step of determining whether the first data channel can receive the data communication comprises:
transmitting the data communication to the mobile communication unit via the first data channel; and
detecting an interruption of the first portion of the first data channel, the interruption of the first portion of the first data channel indicating that the first data channel cannot receive the data communication.

10. The method according to claim 8, wherein the step of determining whether the first data channel can no longer receive the data communication comprises:
determining that the mobile communication unit is not available to receive the data communication.

11. The method according to claim 8, wherein a second portion of the first data channel comprises a circuit mode connection.

12. The method according to claim 1, wherein the second data channel comprises a circuit mode connection.

13. The method according to claim 1, further comprising:
when the first data channel cannot receive the data communication, forwarding a message by the second communication system to the mobile communication unit, the message requesting the mobile communication unit to contact the second communication system.

14. The method according to claim 1, further comprising:
the second communication system informing the first communication system of a status of the data communication.

15. The method according to claim 14, wherein the status comprises an amount of the data communication transmitted via the first data channel.

16. A method for transmitting a data communication from a calling communication unit to a called communication unit, the called communication unit responsive to a wireless communication system, the method comprising:
establishing a first data channel between the calling communication unit and the wireless communication system, the first data channel configured to receive and transmit the data communication;
establishing a second data channel between the wireless communication system and the called communication unit, the second data channel configured to receive and transmit the data communication;
transmitting the data communication by the first data channel;
determining whether the second data channel can no longer receive the data communication; and
when the second data channel can no longer receive the data communication, continuing to transmit the data communication via the first data channel;
storing the portion of the data communication that is continuing to be transmitted via the first data channel, wherein the step of storing includes storing the data communication by an interworking unit within the wireless communication system and the interworking unit further records an amount of the data communication transmitted successfully via the second data channel;
determining whether the second data channel can resume receiving the data communication; and
delivering the stored data communication to the called communication unit, wherein the step of delivering includes accessing the called communication unit via the wireless communication system.

* * * * *